United States Patent
Raileanu et al.

(10) Patent No.: US 8,849,732 B2
(45) Date of Patent: Sep. 30, 2014

(54) ADAPTIVE REMOTE MAINTENANCE OF ROLLING STOCKS

(75) Inventors: Ciprian Dan Raileanu, Jersey City, NJ (US); Mathaeus Dejori, Los Angeles, CA (US); Frank Popp, Fürth (DE); Ekkehard Toensing, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/876,195

(22) PCT Filed: Sep. 22, 2011

(86) PCT No.: PCT/US2011/052718
§ 371 (c)(1),
(2), (4) Date: Aug. 20, 2013

(87) PCT Pub. No.: WO2012/047529
PCT Pub. Date: Apr. 12, 2012

(65) Prior Publication Data
US 2013/0325762 A1  Dec. 5, 2013

Related U.S. Application Data

(60) Provisional application No. 61/387,043, filed on Sep. 28, 2010.

(51) Int. Cl.
G06F 15/18 (2006.01)
G06Q 10/08 (2012.01)
B61L 27/00 (2006.01)
G06Q 50/28 (2012.01)

(52) U.S. Cl.
CPC ............ *B61L 27/0094* (2013.01); *G06Q 10/08* (2013.01); *G06Q 50/28* (2013.01)
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 8,744,807 B2 * | 6/2014 | Dejori et al. | 702/187 |
| 2002/0144551 A1 * | 10/2002 | Satsangi | 73/659 |
| 2004/0024773 A1 | 2/2004 | Stoffel et al. | |
| 2005/0177269 A1 | 8/2005 | Funk | |
| 2005/0187649 A1 * | 8/2005 | Funk et al. | 700/121 |

(Continued)

OTHER PUBLICATIONS

Keith Blandon, et al., RTSA "Predictive Condition Monitoring of Railway Rolling Stock," Conference on Railway Engineering, Darwin 20-23, Jun. 2004.

WMA Wayside Monitoring Alliance, "Predictive Condition Monitoring," pp. 1-2, Jun. 2004.

(Continued)

*Primary Examiner* — Michael B Holmes

(57) ABSTRACT

Adaptive remote maintenance of rolling stocks is provided by machine-learning (28) of rules. Existing rules or models are automatically updated. Machine learning (28) is applied to establish a more efficient rule set. Rules may be replaced, generalized, or otherwise adapted based on interaction (26) by the dispatchers with the results of the current rules. The acceptance or discarding of an event by the dispatcher is used as a ground truth for supervised machine learning (28) of a new rule. The machine learning (28) uses user feedback to update the rule set.

20 Claims, 2 Drawing Sheets

(56) References Cited

U.S. PATENT DOCUMENTS

| | | |
|---|---|---|
| 2008/0228769 A1 | 9/2008 | Lita et al. |
| 2009/0019032 A1 | 1/2009 | Bundschus et al. |
| 2011/0035187 A1 | 2/2011 | Dejori et al. |
| 2012/0259885 A1* | 10/2012 | Palla et al. .................... 707/769 |
| 2013/0325762 A1* | 12/2013 | Raileanu et al. ................ 706/12 |

OTHER PUBLICATIONS

Argos Systems, "We Keep an Eye on the Rolling Stock," Wayside Train Monitoring Systems, printed Aug. 15, 2011.

International Search Report.

* cited by examiner

ADAPTIVE REMOTE MAINTENANCE OF ROLLING STOCKS

RELATED APPLICATIONS

The present patent document claims the benefit of the filing date under 35 U.S.C. §119(e) of Provisional U.S. Patent Application Ser. No. 61/387,043, filed Sep. 28, 2010, which is hereby incorporated by reference.

BACKGROUND

The present embodiments relate to remote maintenance of rolling stocks. Information from rolling stock, such as trains or trucks, is monitored to identify problems or incidents that may need maintenance.

In a typical condition-based maintenance setting, monitored units are equipped with a series of sensors and message-emitting devices. In rolling stocks, a control system located on the train or trucks is constantly monitoring raw sensor readings and creating messages (e.g., alerts) in case sensor readings are below or above predefined thresholds. Each generated messages has a code which defines severity and the unit subsystem to which the message is applicable. Additionally, each message has a timestamp corresponding to the time when the problem or warning occurred. The messages and sensor readings are transferred from the train to a monitoring station on a regular basis.

Fleet dispatchers use the messages and sensor readings as an overview of how the fleet performs and to take actions (e.g. issue maintenance or repair orders). The data is collected and constantly analyzed. Diagnosis messages are flowing to the monitoring station at a high rate and large volume across a fleet's units. Dispatchers are confronted with the cumbersome task of manually filtering out and grouping together various messages and sensor data in order to identify actual events or events requiring further action. With large fleets, the identification of events is even more burdensome. Some of the messages or sensor readings may be mere anomalies, associated with expected occurrences or otherwise not of interest.

To assist analysis, a set of business rules or statistical models which have been learned utilizing available historical data are applied to the data. However, these rules or models may not accurately group the information, resulting in extra work for dispatchers.

SUMMARY

In various embodiments, systems, methods and computer readable media are provided for adaptive remote maintenance of rolling stocks. Existing rules or models are automatically updated or adapt. Machine learning is applied to establish a more efficient rule set. Rules may be replaced, generalized, or otherwise adapted based on interaction by the dispatchers with the results of the current rules. The acceptance or discarding of an event by the dispatcher is used as a ground truth for supervised machine learning of a new rule. The machine learning uses user feedback to update the rule set.

In a first aspect, a method is provided for adaptive remote maintenance of rolling stocks. Diagnostic information is received for rolling stock operation. A processor identifies a plurality of events based on a plurality of current rules applied to the diagnostic information. The current rules and corresponding events are for maintenance incidents of the rolling stock. Dispensation information is received and shows dispensation of the events relative to the respective current rules. The dispensation corresponds to event validation and event discarding. The processor applies supervised learning to the diagnostic information with the event validation and event discard as ground truth information. A new rule is output from the applying of the supervised learning. The new rule is different than any of the current rules.

In a second aspect, a system is provided for adaptive remote maintenance of rolling stock. At least one memory is operable to store messages, sensor data or messages and sensor data from subsystems of a fleet of trains. A processor is configured to receive performance information for application of an existing rule for identifying a first type of event for the fleet of trains from the messages, the sensor data, or the messages and the sensor data. The processor is also configured to learn a new rule identifying the first type of event for the fleet of trains from the messages, the sensor data, or the messages and the sensor data. The new rule is learned based on the performance information. The new rule has a timing limitation, a frequency limitation, or timing and frequency limitations for the messages, sensor data, or messages and sensor data different than the existing rule.

In a third aspect, a non-transitory computer readable storage medium has stored therein data representing instructions executable by a programmed processor for adaptive remote maintenance of rolling stock. The storage medium includes instructions for receiving data representing occurrences sensed by the rolling stock, observing user actions regarding events triggered by application of existing rules to the data, and learning by the processor of a further rule from the observing and the data.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION OF EMBODIMENTS

An adaptive rule engine system is provided for remote maintenance of rolling stocks. Rolling stocks include any powered or unpowered vehicle or car operating on a railroad. For example, locomotives, railroad cars, coaches and wagons are rolling stock. In other embodiments, rolling stock includes trucks operating on roads.

Rules are applied to data from the rolling stock to identify any maintenance or upkeep issues. Messages and sensor data are collected from monitored units, such as any rolling stock vehicle, or sub-units, such as a part of a rolling stock vehicle (e.g., refrigeration subsystem). The rules take as input live or stored message and sensor data feeds and output events. The events are groupings of the received data, allowing the dispatcher to more efficiently control maintenance without separately dealing with different received data for a same incident. For example, a message about signal loss from a refrigeration unit and a message about excess temperature reading are detected and sent independently, but are associated with a same event—break down of the refrigeration unit. Some rules may not generate events correctly, missing events, identifying false events, or not including a complete grouping of data for a given event.

To avoid inefficiencies due to incorrect event identification, a condition-based maintenance system for rolling stocks automatically adapts existing expert-defined business rules and learns new, more accurate rules based on diagnosis messages and sensor data. User feedback is processed to adapt user-defined rules, improve their accuracy, recommend changes, and even suggest novel rules which are not part of the initial rule set.

Figure 1:
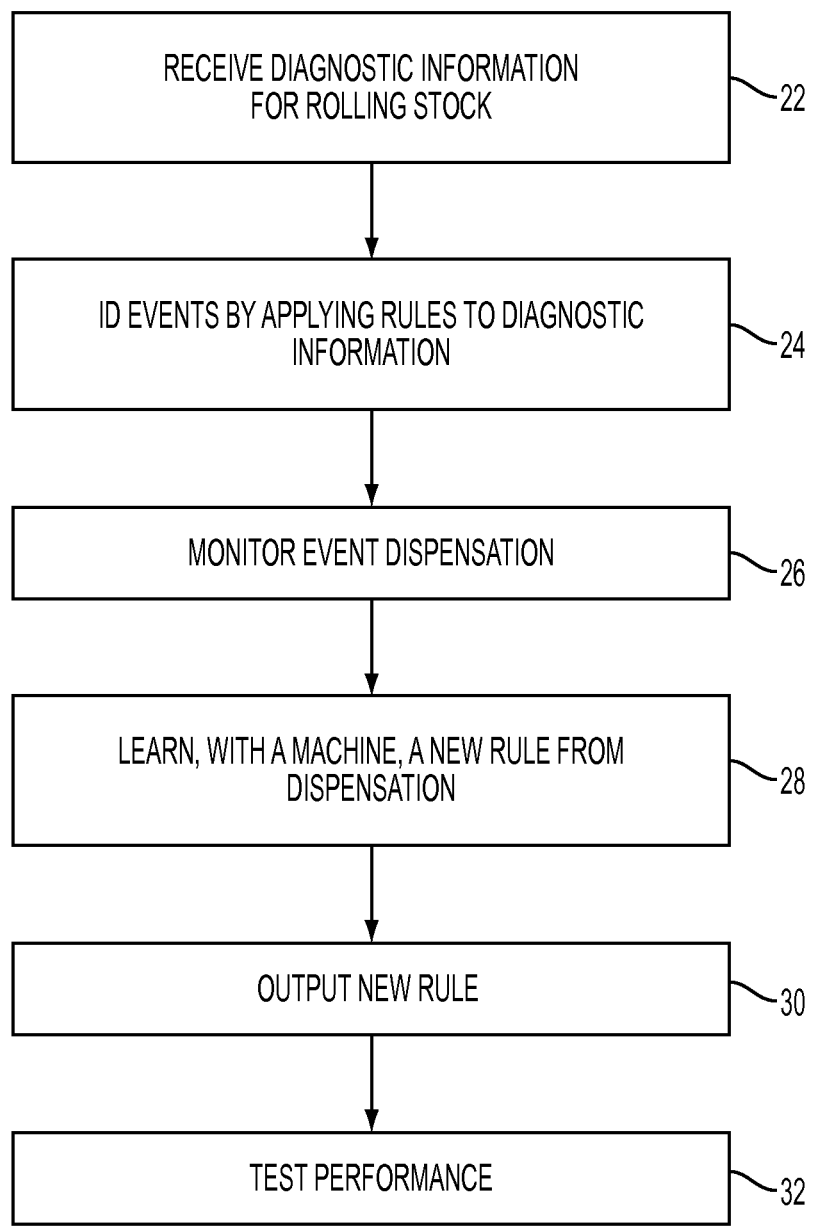
FIG. 1 is a flow chart diagram of one embodiment of a method for adaptive remote maintenance of rolling stocks.
Figure 2:
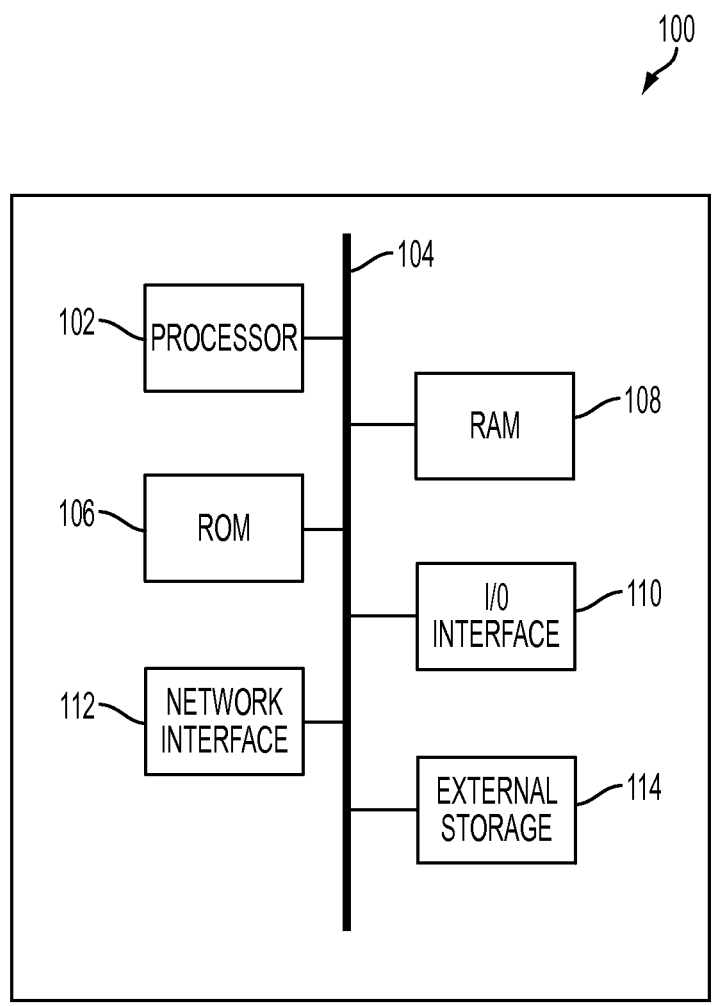
FIG. 2 is a block diagram of one embodiment of a system for adaptive remote maintenance of rolling stocks.

FIG. 1 shows a method for adaptive remote maintenance of rolling stocks. The method is implemented by or on a computer, server, processor, or other device, such as shown in FIG. 2. The method is provided in the order shown, but other orders may be provided. Additional, different or fewer acts may be provided. For example, act 24 of identifying events by applying the rules is not provided, and act 26 performed by acquiring event discrimination information from memory. Rather than performing act 24 and act 26 in real time with receipt of the data in act 22 or rather than gathering information in real time, the method is performed on historical data. As another example, the new rule is used rather than output in act 30.

In act 22, diagnostic information for rolling stock operation is received. A database, computer, processor or other device receives diagnostic information. The receipt is by wireless or wire. For example, the rolling stock is remote, but at a station. A data dump from each train occurs at different times or places, such as whenever the train is at an equipped station. The data dump occurs using WiFi or data transfer on a device. The dumped data is transmitted over the Internet, transmitting through the phone system, by mailing the storage device, or otherwise communicating to a location for receiving the diagnostic information. As another example, the rolling stock includes a satellite phone or other data transmission capability while moving. The data is periodically, as generated, continuously, or when triggered provided to the location for receiving the diagnostic information.

The diagnostic information is data representing occurrences sensed by the rolling stock. The rolling stock has one or more subsystems, such as engine, speed control, location determination, refrigeration, braking, door operation, pump, cargo, equipment stocks, or other subsystem for operating one or more vehicles in rolling stock. Each subsystem includes sensors, such as voltage, current, temperature, pressure, light, sound, or other sensors. The sensors detect the environment and/or operation for a given subsystem, multiple subsystems, component, entire train or other grouping. Alternatively or additionally, the subsystem includes a processor or circuit for sensing proper data processing or computer operation. The subsystems are separate by vehicle, common for the entire train, or have other divisions, such as different brake subsystems for sensing braking performance by vehicle or by wheel truck.

The diagnostic information for each subsystem is generated by the subsystem. Alternatively, the sensor data is routed to a processor for generation of messages or other diagnostic information where the processor interacts with different subsystems.

Diagnostic information may include the sensor data, such as raw environmental data. The sensor data may or may not be processed. For example, the sensor data is temporally filtered so that a given reading represents an average over a time period. The sensor data may be just for times associated with a problem, such as sensor data or readings above a threshold. Alternatively or additionally, the sensor data is ongoing or represents the measurements regardless of event timing. The sensor data may be coded to identify the sensor, subsystem, vehicle, time, and/or train.

Diagnostic information may include messages. A message is an alert, such as a message generated when a sensor value or values exceed parameters. Alternatively, the message is a periodic or monitoring message associated with normal operation or operation within tolerances. The messages may indicate the subsystem, sensor data, time, or other information. For example, the messages include a severity code, subsystem identification, and a time. The severity code is a ranking for how wrong (e.g., past what threshold) and/or for how important (e.g., engine verses a door motor) the subsystem or problem associated with the message. The identification may include a rolling stock identifier, such as train or vehicle number.

In other embodiments, the diagnostic information includes both sensor data and messages. The combination may be provided as part of the message (i.e., sensor readings in the message) or may be separately handled. Other diagnostic information is possible, such as filtered and raw sensor data.

The received diagnostic information may be used without further processing. Alternatively, the diagnostic information is filtered, such as low pass filtering sensor values. Some of the diagnostic information may not be used for applying rules in act 24 or for learning in act 28. Such information may be discarded or not collected. Some of the diagnostic information may be combined or further processed for use in applying the rules in act 24 or for learning in act 28, such as filtering across multiple sensors for a same subsystem or different subsystems to create one value or combined values.

The diagnostic information is received to form a feature vector for machine learning in act 28. The feature vector is a list or group of variables used to calculate statistics and/or train a machine-learned classifier. The diagnostic information provides values for the feature vector. Any missing values may be replaced with an average or predetermined value. The user may be requested to enter a missing value or resolve a choice between possible values for a variable. Alternatively, missing values are not replaced where the machine learning may operate with one or more of the values missing.

Alternatively or additionally, the diagnostic information is received for application of existing rules in act 24. For example, existing rules are applied to the messages and/or sensor data. One or more events are identified by applying current rules. A processor applies the rules to the diagnostic information.

The rules identify events. Any event may be identified. An event may be a malfunction of a subsystem, system, or component. An event may be a predicted malfunction or indication of possible future malfunction. An event may be environmental, such as operating or even being in a moist, cold, hot or other situation likely to lead to a desire for checking or replacing components. An event may be an occurrence, such as a door jamming open or not closing all the way. Any maintenance incident of the rolling stock may be an event and have a corresponding rule to detect the event from the diagnostic information.

Each event represents a collection of data. Messages and/or sensor readings relevant for a specific type of incident are grouped. An event may be associated with a single message and/or a single sensor reading, but may instead be associated with a plurality of messages and/or sensor readings. By grouping the diagnostic information associated with each event, the information is presented in a more efficient manner to a dispatcher. The grouping or event identification helps compress the vast amount of messages and sensor data and only deal with a limited number of notifications (events) for fleet monitoring purposes. The rules are used to group the diagnostic information.

The rules use the message information, time, or other values of variables represented in the diagnostic information to identify an event. For example, two or more messages received within a same day that a door has failed to close are grouped for a door maintenance event. A single message for a door failure may be due to a suitcase or box being in the door. Based on a number of occurrences of a message or sensor reading and/or temporal information, one or more events are identified or the information is ignored/discarded by application of the rules The rules being applied are provided by previous adaptive rule generation. Alternatively, the rules being applied are manually entered or historically used rules. For example, a seed set of rules are manually defined. Users (e.g., experts) define business rules to group messages into events. The rules may be applied to several messages (message codes) and may take into account the number of message occurrences, as well as temporal constraints. A rule may be applicable solely to messages, solely to sensor data, or to a combination of messages and sensor data. Once an initial set of rules is created, the system applies the rules.

The rules are applied in sequence to the incoming flow of message and sensor data in order to create events. Any criteria for the sequence may be used, such as in order of importance or severity of the corresponding event. In one embodiment, the events are identified for one of the rules before another of the rules based, at least in part, on a relative number of events for the one and the other of the rules. The rules associated with more frequent generation of events are applied first. As the evaluation of each rule may be quite expensive when combining intricate restrictions on messages and sensor data with large data sets, the rule engine may keep track of the most "popular" rules and apply them first in the pipeline. Other orders may be used.

In act 26, dispensation information is received. The dispensation information shows dispensation of the events relative to the respective current rules. The dispatcher or other user reviews events. If an event warrants attention, such as dispatching a mechanic or scheduling an activity, the event may have been properly identified or is validated. If the user ignores, disregards, or otherwise rejects an event, the event may not have been properly identified. A human operator may evaluate the events created, and discard some of them as being non-relevant. For example, the user reviews messages and sensor data associated with a rule identified event and determines that an environmental condition (e.g., high temperature) led to the messages rather than an equipment malfunction. The event is rejected. The user may alternatively alter an event, such as removing one or more messages as unrelated despite being grouped for the event or adding one or more messages not previously included in the grouping. Messages and/or sensor data subsets may be removed by the operator from the event if the diagnostic information is considered not to be relevant for a particular problem.

In act 26, the user actions are observed. A processor records the user-induced action taken regarding each event and stores the action in a relational or file-based database for subsequent analysis. The actions may be limited to a binary set (e.g., accept or reject), to a set of multivariates (e.g. accept, non sure, reject) or to a continuous distribution (e.g. 0-1). The limited actions may be mapped to acceptance or rejection. Alternatively, the processor notes any action taken with reference to a rule detected event. In response to events triggered by application of the rules to the data, the user may perform one or more actions using the computer. These actions are observed.

As part of monitoring event dispensation, statistics for different rules are calculated from the user actions. For each rule, statistics are calculated from the dispensation regarding events for the respective rule. The statistics are over any desired period, such as statistics for a month's worth of dispensations. A system observes the human actions and keeps statistics associated with each rule. Example statistics include how many times a rule fired or created an event, how many times the events created by a rule were canceled (discarded), how many modifications were made to the triggered events, and which rules were the most commonly used for event triggering. Additional, different, or fewer statistics may be used.

In act 28, machine learning is applied to the diagnostic information. A processor receives the input feature vector and ground truth information to learn how to discriminate between actual events and undesired information. Any machine learning may be used, such as a supervised learning approach using a statistical model (e.g., Bayesian network). The machine learning determines a classifier distinguishing positive and negative events. The machine-trained classifier is any one or more classifiers. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used. In one embodiment, the machine-trained classifier is a probabilistic boosting tree classifier. The probabilistic boosting tree (PBT) unifies classification, recognition, and clustering into one treatment. Alternatively, a programmed, knowledge based, feature-space search or optimization methods are used.

For learning-based approaches, the classifier is taught to distinguish based on features. For example, a probability model algorithm selectively combines features into a strong committee of weak learners based on values for available variables. As part of the machine learning, some variables are selected and others are not selected. Those variables with the strongest or sufficient correlation or causal relationship to proper event detection are selected and variables with little or no correlation or causal relationship are not selected. Features that are relevant to event identification are extracted and learned in a machine algorithm based on the ground truth of the training data, resulting in a probabilistic model. Any size pool of features may be extracted, such as tens, hundreds, or thousands of variables. The pool includes features determined by the machine during the training process and may be pre-determined by a programmer. All diagnostic information, some diagnostic information, just the diagnostic information associated with events under the current rules, or other grouping of diagnostic information over a time period may be used as an input feature. The training determines the most determinative features for a given classification and discards lesser or non-determinative features. The statistics on observed acceptance/rejection of each rule may be used as input features in training or just for comparison to determine relative performance of rules.

The classifier is trained from a training data set using a computer. To prepare the set of training samples, the observed user dispensation for the events is used as the ground truth. For events and/or diagnostic information, the acceptance or rejection of an event indicates the ground truth. For example, the diagnostic information grouped for an event that is accepted is treated as accepted. For diagnostic information added to or removed from an event, the acceptance (adding of information) or rejection (removing of information) is used to indicate the ground truth.

Any number of records for past diagnostic information is used. For example, the diagnostic information, events and dispensation over a month period is used. Longer or shorter periods may be used, such as over a year in order to account for seasonal variations. By using example or training data for tens, hundreds, or thousands of examples with known dispensation status, a processor may determine the interrelationships of different variables to the outcome of identifying a proper event. The training data is manually acquired, automatically acquired as received, or mined to determine the values of variables in the training data.

Some diagnostic information may not be used for training. For example, diagnostic information associated with a rule that triggered only one or other limited number of events during the relevant period may be discarded. Since the sample size for the rule is so small, the event and associated diagnostic information is not used for training.

The training data is for the rolling stock for which the rules will be applied. By using data for past diagnostic information and/or events of the same rolling stock, the variables or feature vector most relevant to rules for that rolling stock are determined. Different variables may be used by a machine-trained classifier for one fleet than for another fleet or other collection of rolling stock. Some of the training data may be from rolling stock of other entities, such as using half or more of the examples from other entities with similar rolling stock. The training data from the specific entity (e.g., one company) may skew or still result in a different machine-learnt classifier despite also using data from other entities. A larger training data set may be desired. In alternative embodiments, all of the training data is from other entities, such as training rules to be sold or used by a plurality of different companies or for different fleets. The adaptive rules are trained in common for a plurality of different entities.

In a training phase, the processor applies supervised or other learning to the diagnostic information with the event validation and event discard as ground truth information. The processor learns a further rule from the observing and the diagnostic data. By observing the user actions over time, the system proposes rules for pruning from the rule set (e.g., events from a rule are frequently discarded) or proposes modifications to an existing rule in case repeated human interventions are observed.

The training is performed once, periodically, or in response to a trigger. For example, a company responsible for or owning a fleet of rolling stock may wish to have their rules analyzed to increase efficiency. That company or a third party service provider performs the machine learning to provide modified, new, replacement, or different rules. As another example, the learning is on-going, such as being continuous or performed regularly (e.g., as diagnostic data is received or every month). As new equipment, subsystems and/or rolling stock are added, replaced, changed, or age, the performance of one or more rules may be less efficient. By using on-going learning, the differences in diagnostic information are incorporated into the rule set on a regular basis.

A rule-learning module uses the discarded events to recalibrate existing rules by applying supervised learning algorithms that treat validated events as positive cases, and discarded events as negative cases. The generated training set may also be used to learn new rules with new attributes and parameters. The rule learning module may test for new rules, whenever the training set gets updated, and propose a new rule to the user if the accuracy outperforms or generalizes an existing rule.

In act 30, a new rule is output from the applying of the supervised learning. The learnt rules are a matrix. The matrix provides weights for different variables of the feature vectors. The values for the feature vector are weighted and combined based on the matrix. The rules are applied by inputting the feature vector (diagnostic information) to the matrix. Other representations than a matrix may be used. For example, the machine learning may provide statistics identifying the most relevant diagnostic information of a given type of event. A rule is then created from the statistical information. A particular number of messages and/or sensor readings may be used, such as the ten inputs most discriminative for a given event. The rule is then formed from the selected variables or diagnostic information with or without weighting based on the relative contribution of the variable to the outcome.

For application, the predictor of events or machine-learned rule is applied to the diagnostic information of a fleet. The diagnostic information is input to the predictor matrix or rules. The matrix or rules output any triggered events based on the learned statistical combination. A dispatcher or other user may act on the events. The user validates one or more events, such as by assigning a maintenance ticket or scheduling work on the rolling stock or subsystem. The user may discard one or more events, believing the event to not be important or accurate.

A probability may be associated with any triggered events to show the likelihood of the event being real or correct. The probability information may help the user dispose of the event and/or be used as a priority for which events to review earlier.

The output is to a dispatcher, programmer, or other person. Alternatively, the output is to a computer or data storage device, such as saving the matrix or other form of rules learned by the machine.

A new rule may be output if the accuracy outperforms or generalizes an existing rule. Alternatively, the new rule is output for comparison with the current rules.

The rules output, regardless of form, are the same or different than the existing rules (i.e., rules used for establishing the ground truth). For example, the rules may be the same where the existing rules are found to be optimal. As another example, a completely new rule is proposed. The new rule is different than any of the current rules, such as relying on different messages, sensor data, or messages and sensor data. The new rule may be different by using a different period or combination of periods, such as two or more of one type of message within a first period and one or more messages of a different type within a second period from the same or different temporal trigger time. The new rule may include some of the same criteria.

The new rule may replace one or more of the current rules. For example, the new rule is a generalization of two or more current rules. The generalization may be less accurate, but more efficient. The generalization may be more accurate but less efficient. The new rule may be more accurate and more efficient. Accuracy indicates a greater ratio of correctly identified events to incorrectly identified events. Efficiency is for computer processing time regarding application of the rule and/or user time to review events. Rule generalization may lead to a smaller, more precise rule set, which may be applied faster than a larger set consisting of several overlapping rules.

In one embodiment represented by act 32, the performance of a new rule is compared to the performance of a current or old rule. Performance is tested based on dispensation. A new rule would replace or alter an existing rule in the case the new rule performs better than the previous one given related user feedback. The new rule is implemented to test performance. If the acceptance rate of events triggered by the new rule is higher (or the rejection or change rate lower), the new rule replaces the old or current rule. Alternatively, performance is tested by the number of messages, sensor data, or messages and sensor data included or not in generated events. The number of events generated given the same input diagnostic information may indicate performance. By including more messages and/or generating fewer events, the performance may be considered better. Performance may be tested in this way based on previously acquired data and before application in real time or for actual messages being received. Other performance testing may be used.

If fewer events are to be discarded, more messages included in events, or fewer events generated with a new rule, the new rule may replace a current rule. The performance may be initially judged as whether more messages are caught in the event grouping. This may be an indication that the rule will result in fewer event discards. Other criteria for replacing one or more current rules with a new rule may be used, such as measures of efficiency.

The rules output may be applied to subsequently received diagnostic information from rolling stock. Events are generated and the diagnostic information grouped by events to reduce the burden of identifying issues with the rolling stock. Conditional-based maintenance may more easily, efficiently, and/or accurately be performed.

Where different rules or rule sets are learned for different entities, such as different fleets of rolling stock, different input features (types of diagnostic information), different limitations on the supervised learning, or other differences may be included in the learning. The output rules are specific to and/or configurable for specific rolling stock. Alternatively, the rules are learnt for more general application.

By continuing to receive dispensation information and received diagnostic information, the rule set may be adapted again. The rules may be relearned, but be more optimized.

FIG. 2 is a block diagram of an example computer processing system 100 for implementing the embodiments described herein, such as adaptive remote maintenance of rolling stock. The systems, methods and/or computer readable media may be implemented in various forms of hardware, software, firmware, special purpose processors, or a combination thereof. Some embodiments are implemented in software as a program tangibly embodied on a non-transitory program storage device. By implementing with a system or program, completely or semi-automated rule generation adaptive to user feedback is provided.

The system 100 is for adaptive remote maintenance of rolling stock. Alternatively or additionally, the system 100 is for applying the rules. The system 100 is part of a system for maintaining or operating rolling stock. Alternatively, the system 100 is for learning rules that are then provided to a separate system for application.

The system 100 is a computer, personal computer, server, workstation, dispatch system, network processor, or other now know or later developed processing system. The system 100 includes at least one processor (hereinafter processor) 102 operatively coupled to other components via a system bus 104. The processor 102 implements the operations as part of the system 100 or a plurality of systems. A read-only memory (ROM) 106, a random access memory (RAM) 108, an I/O interface 110, a network interface 112, and external storage 114 are operatively coupled to the system bus 104 with the processor 102. Various peripheral devices such as, for example, a display device, a disk storage device (e.g., a magnetic or optical disk storage device), a keyboard, printing device, and a mouse, may be operatively coupled to the system bus 104 by the I/O interface 110 or the network interface 112. Direct connections instead of the system bus 104 may be used.

A program may be uploaded to, and executed by, the processor 102 comprising any suitable architecture. Likewise, processing strategies may include multiprocessing, multitasking, parallel processing and the like. The processor 102 is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 102 is one or more processors in a network and/or on a dispatch system.

The computer system 100 may be a standalone system or be linked to a network via the network interface 112. The network interface 112 may be a hard-wired interface. However, in various exemplary embodiments, the network interface 112 may include any device suitable to transmit information to and from another device, such as a universal asynchronous receiver/transmitter (UART), a parallel digital interface, a software interface or any combination of known or later developed software and hardware. The network interface may be linked to various types of networks, including a local area network (LAN), a wide area network (WAN), an intranet, a virtual private network (VPN), and the Internet.

The instructions, user feedback (dispensation information), rules, and/or diagnostic information are stored in a non-transitory computer readable memory, such as the external storage 114, RAM 108, ROM 106, and/or a local memory (e.g., solid state drive or hard drive). The same or different computer readable media may be used for the instructions and other data. The external storage 114 may be implemented using a database management system (DBMS) managed by the processor 102 and residing on a memory such as a hard disk, RAM, or removable media. Alternatively, the storage 114 is internal to the processor 102 (e.g. cache). The external storage 114 may be implemented on one or more additional computer systems. The external storage 114, an internal storage, other computer readable media, or combinations thereof store data for at least one fleet or set of rolling stock. The data may be distributed among multiple storage devices or in one location.

The data for training a machine learning classifier or rules is stored. Messages, sensor data or messages and sensor data from subsystems of a fleet of trains are stored. The training data also includes event information, including dispensation of triggered events. Alternatively or additionally, the data for applying a machine-learnt classifier is stored. The data includes rules for compiling the diagnostic information into events.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method steps depicted in the accompanying figures are preferably implemented in software, the actual connections between the system components (or the process steps) may differ depending upon the manner in which the present embodiments are programmed.

The processor 102 is configured, by the instructions, to receive performance information, diagnostic information, and/or rules. Receipt is by uploading from memory or by transfer. Data specific to or generalized for a fleet of trains or other rolling stock is received.

The performance information is for application of an existing rule. As the rule is applied, events are generated. Acceptance, discarding, or changing of the event indicates performance. The performance information is used as feedback.

Each rule is specific to a type of event. For example, one rule identifies problems associated with a particular subsystem or even particular component of a particular subsystem. One or more rules may be more general, such as identifying a class of events associated with one or more components. One or more rules may generate different types of events, such as identifying different problems for a same subsystem.

The processor 102 receives diagnostic information. Messages, sensor data, both messages and sensor data, or other information indicating operation of the rolling stock are received.

The processor 102 is configured to learn one or more rules, such as learning a classifier incorporating one or more rules. Any machine-learning process or program may be used, such as a statistical model (e.g., Bayesian net).

For training, the processor 102 determines the relative or statistical contribution of different variables to the outcome, an accepted event. A programmer may select variables to be considered. The programmer may influence the training, such as assigning limitations on the number of variables and/or requiring inclusion of one or more variables to be used as the input feature vector of the final classifier. By training, the classifier identifies variables contributing to acceptable events.

The machine-learning learns a new rule. The new rule is for identifying events of one or more types for the fleet of trains. The messages, the sensor data, both the messages and the sensor data, or other data is used to learn the statistical relationship of the data to the outcome. The performance information indicates the outcome, so the new rule is learned based on the performance information. The acceptance and rejection of events of one or more types based on an existing rule is used to create a new rule. The new rules may be learned based on user creation of the performance information while monitoring the fleet of trains for maintenance issues. The gathering of ground truth is thus simplified, avoiding an expert having to analyze the training data.

The new rules have a timing limitation, a frequency limitation, both timing and frequency limitations, or other limitations. Timing limitations may indicate acceptable periods between sensor readings of a certain level or between messages of the same or different type. Frequency limitations may indicate a number of occurrences of sensor regions of a certain level or messages of one or more types. The limitations define the rule or criteria used to identify an event.

For a new rule, different limitations may be used. The new rule may additionally or alternatively include different messages, sensor data, or both messages and sensor data for triggering an event. The new rule is different than the existing rule. The new rule may be a modification of the existing rule and/or a generalization of the existing rule and another existing rule.

For application, the processor 102 applies the resulting (machine-learned) statistical model or rules to the received data (e.g., messages, sensor data, or other diagnostic information). A different processor may apply the rules. The rules may be applied for testing, such as to measure performance difference. Alternatively, the rules are applied for use by dispatchers or with the rolling stock. The received data is applied to the rules as input into the machine-learned matrix. The matrix outputs whether or not an event is appropriate based on the input. Since rules are created, a machine-learning process operable or usable with missing information is used.

In an additional embodiment, the processor 102 is configured to prioritize the application of the rules. The statistics on the events and corresponding rules are used to control which rules are applied to the data first. For example, a different classifier or rule is provided for each type of event. The rules associated with more frequently triggered events are applied first. As soon as the received diagnostic information is analyzed for a given rule and does not trigger an event, the next rule in the priority list is applied. Once the diagnostic information triggers an event, other rules may not be applied, saving processing time.

Other criteria than relative frequency of event generation may be used to prioritize the rules. For example, the priority is by type of event where rules for more time critical events (e.g., broken engine or refrigeration) are applied before rules for less time critical events (e.g., door failure).

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for adaptive remote maintenance of rolling stocks, the method comprising:

receiving diagnostic information for rolling stock operation;

identifying a plurality of events based on a plurality of current rules applied to the diagnostic information, the current rules and corresponding events being for maintenance incidents of the rolling stock;

receiving, by a processor, dispensation information showing dispensation of the events relative to the respective current rules, the dispensation corresponding to event validation and event discarding;

applying, by the processor, supervised learning to the diagnostic information with the event validation and event discard as ground truth information; and outputting a new rule from the applying of the supervised learning, the new rule being different than any of the current rules.

2. The method of claim 1 wherein outputting the new rule comprises replacing a plurality of the current rules with the new rule.

3. The method of claim 1 wherein outputting the new rule comprises replacing one of the current rules.

4. The method of claim 3 further comprising:
testing performance of the one of the current rules; and
testing performance of the new rule;
wherein the replacing is performed where the performance of the new rule results in fewer event discards than the performance of the one of the current rules.

5. The method of claim 1 wherein receiving the diagnostic information comprises receiving messages having a severity code, subsystem identification, and a time.

6. The method of claim 1 wherein receiving the diagnostic information comprises receiving sensor readings.

7. The method of claim 1 wherein identifying the events comprises grouping the diagnostic information associated with each event.

8. The method of claim 1 wherein identifying the events comprises applying the current rules based on number of occurrences of diagnostic information and temporal constraints.

9. The method of claim 1 wherein applying the supervised learning comprises calculating statistics for each of the rules, the statistics calculated from the dispensation regarding events for the respective rule.

10. The method of claim 1 further comprising:
performing the identifying for one of the rules before another of the rules based, at least in part, on a relative number of events for the one and the other of the rules.

11. A system for adaptive remote maintenance of rolling stock, the system comprising:
at least one memory operable to store messages, sensor data or messages and sensor data from subsystems of a fleet of trains; and
a processor configured to:
receive performance information about a quality of performance of application of an existing rule for identifying a first type of event for the fleet of trains from the messages, the sensor data, or the messages and the sensor data; and
learn a new rule identifying the first type of event for the fleet of trains from the messages, the sensor data, or the messages and the sensor data, the new rule having a timing limitation, a frequency limitation, or timing and frequency limitations for the messages, sensor data, or messages and sensor data different than the existing rule, the new rule learned based on the performance information.

12. The system of claim 11 wherein the new rule is a modification of the existing rule.

13. The system of claim 11 wherein the new rule is a generalization of the existing rule and another existing rule.

14. The system of claim 11 wherein the processor is configured to prioritize the new rule relative to other rules such that the rules associated with more frequently occurring types of events including the first type are applied before other of the rules.

15. The system of claim 11 wherein the performance information comprises acceptance and rejection of events of the first type based on the existing rule.

16. The system of claim 15 wherein the processor is configured to learn based on user creation of the performance information while monitoring the fleet of trains for maintenance issues.

17. In a non-transitory computer readable storage medium having stored therein data representing instructions executable by a programmed processor for adaptive remote maintenance of rolling stock, the storage medium comprising instructions for:
receiving data representing occurrences sensed by the rolling stock;
observing user actions regarding events triggered by application of existing rules to the data; and
learning by the processor of a further rule from the observing and the data.

18. The non-statutory computer readable storage medium of claim 17 wherein learning comprises supervised learning where the user actions of accepting and discarding events is a ground truth and the data is the input features.

19. The non-statutory computer readable storage medium of claim 17 wherein observing comprises calculating statistics from the user actions relative to the rules.

20. The non-statutory computer readable storage medium of claim 17 wherein receiving comprises receiving messages and sensor data;
further comprising applying the existing rules to the messages and sensor data;
wherein observing comprises receiving user indication of acceptance or rejection of the events; and
wherein learning comprises machine learning with the acceptance and the rejection of the events comprising a ground truth and the messages and sensor data comprising input features.

* * * * *